Sept. 18, 1962 A. E. COOPER ETAL 3,054,998
METHOD FOR COMPARING CONFIGURATIONS
Filed Oct. 4, 1952 3 Sheets-Sheet 1
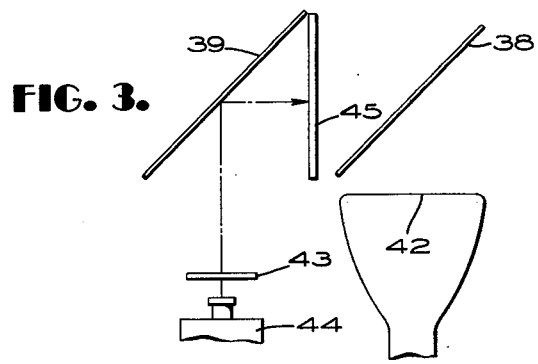
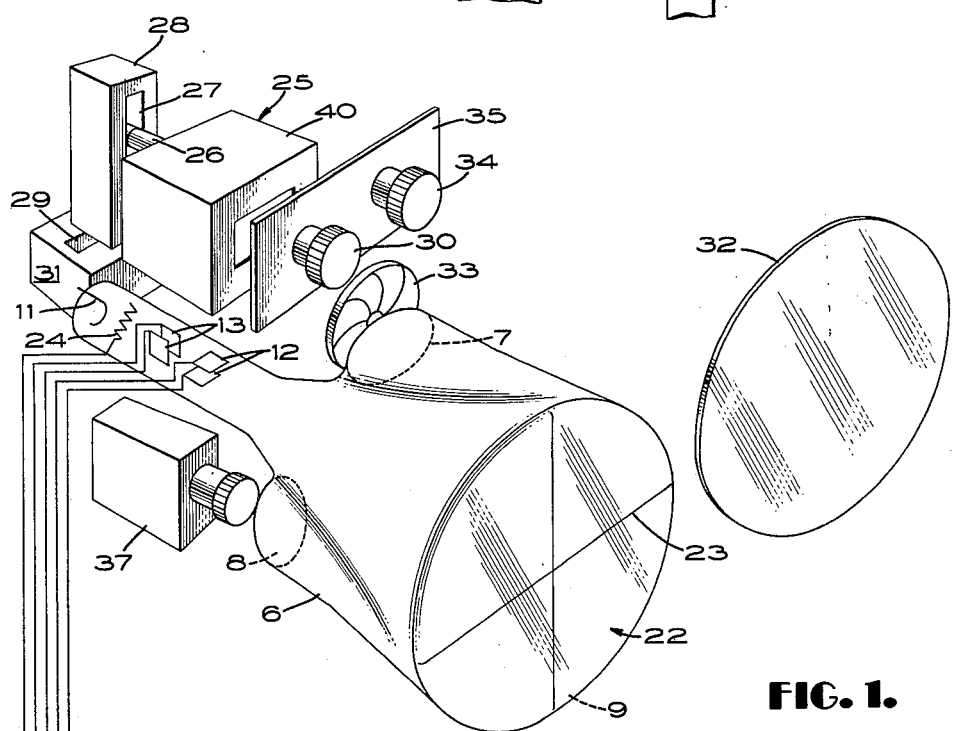
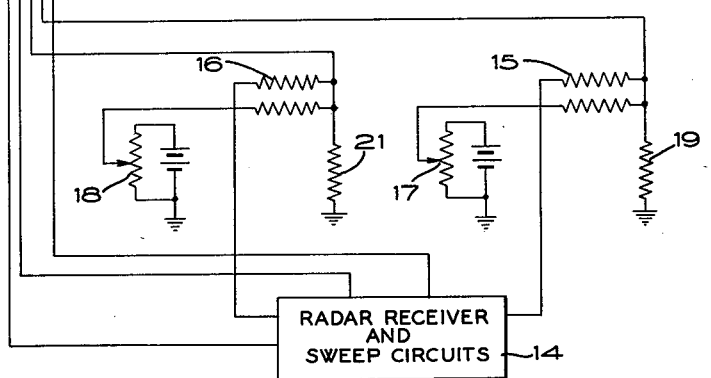
INVENTORS
ARTHUR E. COOPER
MERRITT W. OLSON
BY
*John P. Dority*
ATTORNEY

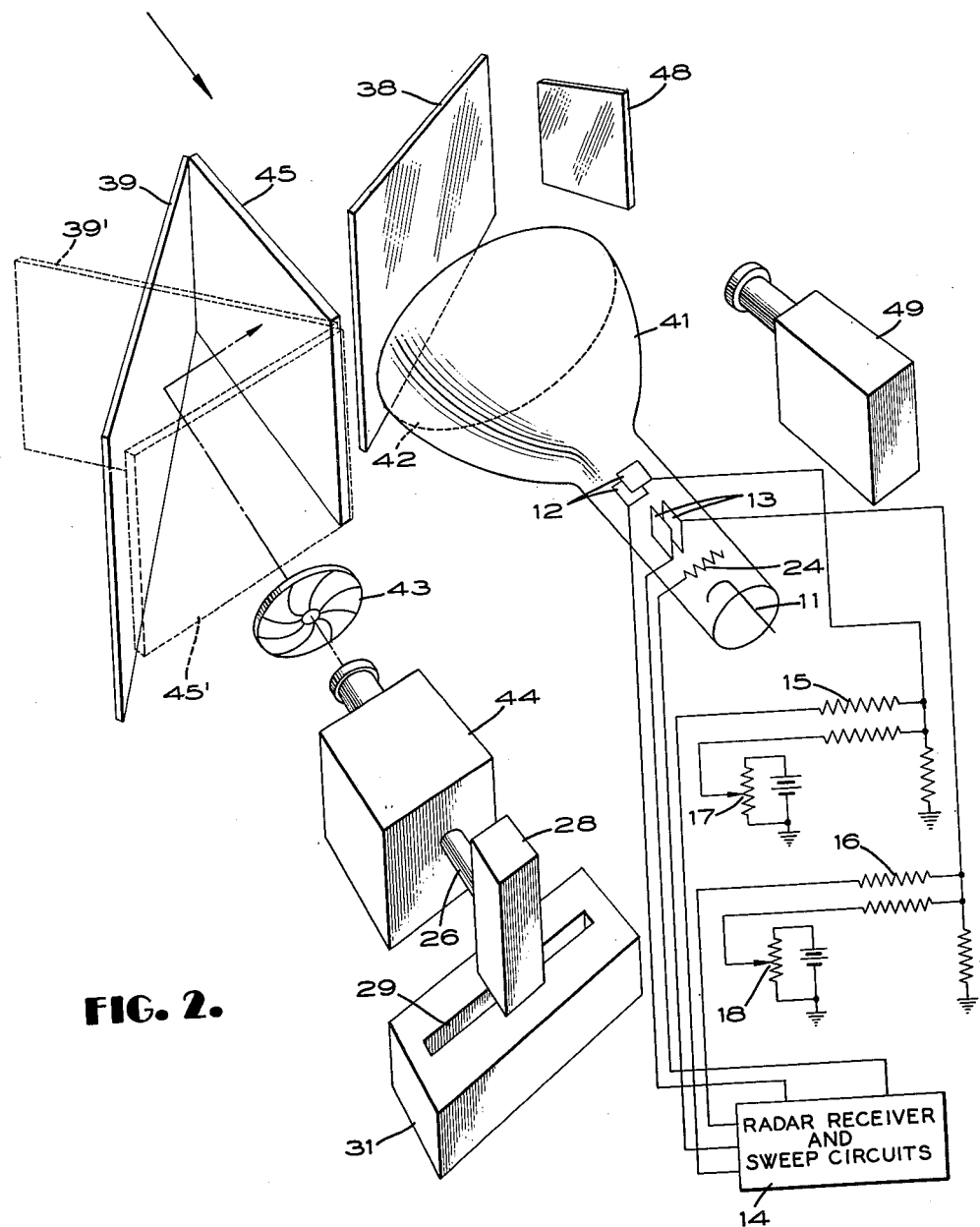

3,054,998
METHOD FOR COMPARING CONFIGURATIONS
Arthur E. Cooper, Vestal, and Merritt W. Olson, Endicott, N.Y., assignors to International Business Machines Corporation, New York, N.Y., a corporation of New York
Filed Oct. 4, 1952, Ser. No. 313,174
11 Claims.  (Cl. 343—5)

This invention relates to improvements in a method for comparing two configurations and accurately superposing one configuration on a second similar configuration.

When determining that two configurations contain substantially the same details or are similar, it is desirable to view them in a side-by-side position. Once it has been determined that a first and a second configuration are similar it remains difficult with the configurations in the side-by-side position to accurately locate a point or area, undefined by sharp details, in the first configuration by comparing the details of the first with the details of the second where the second configuration has the point or area marked therein. Error in locating such a point arises largely from error in human judgment. It is seen, however, that if an image of the second configuration is accurately superposed on the first configuration and if a point on the second is marked then the same point on the first will be accurately located by the mark on the second.

In the past the problem of accurately superposing two similar configurations has been difficult of solution and almost impossible with certainty if features in the configurations are not sharply defined. Generally it has been necessary to view the configurations through small apertures or from a narrowly limited field of view. Even under these conditions inaccuracy in superposing arises, and the degree and direction of inaccuracy varies between individuals.

Accordingly an object of this invention is to provide an improved method for superposing two similar configurations.

A further object of this invention is to provide an improved method for determining similarity between configurations and superposing a first configuration on a second similar configuration.

A further object of this invention is to provide an improved method for locating a position within a configuration.

A still further object of this invention is to provide an improved method for positioning a crosshair sight upon a target.

Still a further object of this invention is to provide an improved method for identifying a target within a radar presentation.

Another object of this invention is to provide an improved method for superposing two similar configurations wherein ease of operation is had.

Another object of this invention is to provide an improved method wherein an unskilled operator may accurately superpose two similar configurations.

Another object of this invention is to provide an improved method for superposing two similar configurations wherein the factor of error arising through personal judgment is minimized.

Another object of this invention is to provide an improved method for superposing two similar configurations wherein the operator is allowed a relatively wide field of view in making the superposition.

A further object of this invention is to provide an improved method for superposing two similar configurations wherein the two configurations may be individually identified when out of superposition.

According to a preferred embodiment of this invention a radar presentation of a ground area is first compared with a previously obtained radar map with the two in side-by-side positions. The radar image is presented on a radar scope having crosshairs marked on the face thereof. The radar map of a target area will have the target accurately marked thereon. Once it is determined that a radar map corresponds to the radar presentation, an image of the map is projected on the radar scope so that the image of the mark on the map falls directly under the crosshairs marked on the radar scope. The projection of the radar map is intermittently interrupted at a frequency below the critical flicker frequency of the human eye.

When viewing the radar presentation under these conditions, the details of the radar presentation appear to fluctuate in a direction and to an extent determined by the direction and extent the image of the map is out of superposition with the radar presentation. The radar presentation is moved under the crosshairs in the direction of the fluctuation until it is observed that the fluctuation is eliminated. When the observed fluctuation is eliminated the radar presentation and the image of the radar map are in exact superposition. The crosshairs are in this way exactly located on the desired target within the radar presentation even though the target itself is not displayed by the radar presentation.

The method for coordinating a simulated configuration with a cathode ray tube presentation shown herein is described and claimed in the copending application of Arthur E. Cooper, Serial No. 313,173, filed October 4, 1952, now abandoned.

Something is known of the phenomenon causing an apparent motion when there is an intermittent display of two light sources but no motion.

Since about 1833 when the stroboscope was invented it has been known that a series of stationary visual stimuli, not far apart in the visual field, presented in fairly rapid succession with intervening blank intervals, gives the appearance of motion. This psychological principle is utilized in motion pictures. There is no continuous motion on the screen. A projector presents a series of still views, with blank intervals due to cutting off the light while the film is advanced from each frame to the next. What we see is actually not a moving picture. If a picture should move slowly on the screen, the eyes would follow it and we should simply see the picture move. If this motion exceeded the possible speed of the pursuit movement of the eyes, we should get blurs and streaks and no pictures.

The reason that we see motion when all there is to see is a series of still views with blank intervals lies partly in the after-lag of retinal sensation, the same after-lag which produces the blurs and streaks just mentioned. However, if retinal after-lag were all, we should see, not a smooth movement but a step-like, jagged series of successive positions. Wertheimer conceived of diffusion circles in the cortex rather than in the retina. The cortical excitation may have some spread and the shift from one stimulus to the next may produce a movement of excitation along the cortex. The impression of movement will thus be fully sensory in character and not inferential or due to associations formed in past experience.

The above is one of the accepted theories explaining this phenomenon. Many others may be found in the literature. One embodiment of this invention illustrates this phenomenon in that an alternate displaying of two similar images for equal intervals of time gives the impression of jumping or motion. This invention also illustrates a different phenomenon since an intermittent display of one image on a constant display of another similar image gives the impression of a fluctuation or bulging in the constantly displayed image and not the impression of an image moving between two limits. It is accordingly another object of this invention to provide an improved method for superposing a first configuration on a second similar configuration wherein the extent and direction of error in superposition of the first on the second is conspicuously indicated.

Other objects of the invention will be pointed out in the following description and claims and illustrated in the accompanying drawings, which disclose, by way of examples, the principle of the invention and the best mode, which has been contemplated, of applying that principle.

In the drawings:

FIG. 1 is a schematic perspective view partly in block form showing a preferred embodiment of a system for comparing two configurations and superposing one configuration on a second similar configuration.

FIG. 2 is a schematic perspective view partly in block form of a variation of the system shown in FIG. 1 using a commercially available cathode ray tube.

FIG. 3 is a schematic plan view of optical structure shown in FIG. 2.

Figure 4:
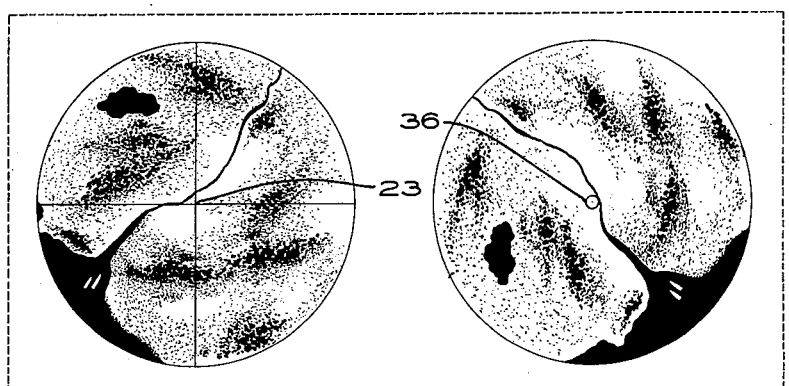
FIG. 4 is a view of a radar presentation and a radar map of the same area viewed in side-by-side position.

Referring to FIG. 1, a cathode ray tube 6 with two windows 7 and 8 formed in the back side thereof is shown equipped with a screen 9 of phosphor or some like material formed on the back of the face 22 of the tube. This tube is provided with the usual electron gun 11 and deflecting means shown as vertical deflecting plates 12 and horizontal deflecting plates 13. A radar receiver and associated sweep circuits 14 shown in block form, control the cathode ray tube to present a radar picture or presentation on screen 9. The sweep voltages from the radar receiver and sweep circuits are applied across resistors 15 and 16 to be combined with biasing voltages shown schematically as taken from potentiometers 17 and 18. The combined voltages are taken across resistors 19 and 21 and applied to deflecting plates 12 and 13 respectively so that the radar presentation may be positioned vertically and horizontally on screen 9 by adjusting the potentiometers 17 and 18. Adjustment of potentiometer 17 moves the radar presentation vertically on screen 9 and adjustment of potentiometer 18 moves the presentation horizontally. Although potentiometers are shown for biasing the sweep voltages to move the radar presentation on the screen of the cathode ray tube a computer, not shown, might well control the sweep voltages to automatically position the radar presentation. The face 22 of the cathode ray tube is shown with crosshairs 23 drawn thereon although these crosshairs might as well be produced electrically by modulating the beam of the cathode ray tube by grid 24 and displayed on the phosphor screen. Positioning of the crosshairs on a target is thus accomplished by moving the target presentation under the crosshairs.

A projector 25 is shown adjusted to project the image of a radar map of the area under observation through window 7 to the back side of phosphor screen 9 of the cathode ray tube. It has been observed that a picture so projected can be advantageously viewed from the front of the phosphor screen. Projector 25 includes two wide angle lenses 30 and 34 mounted on a shield 35 and a housing 40 for enclosing a light source and film, not shown. Housing 40 is movable with respect to shield 35. When projecting an image to the screen of the cathode ray tube, housing 40, with a film contained therein, is positioned away from the optical axis of lens 30 so that the film is projected to screen 9. Screen 9 is not aligned with the optical axis of lens 30, but since lens 30 is a wide angle lens it is capable of projecting the image of the film to the screen.

Means for positioning the image of the radar map are shown schematically in FIG. 1. Housing 40 is fixedly mounted on a shaft 26. Rotation of shaft 26 rotates housing 40 to rotate the projected image. Movement of shaft 26 along slot 27 in member 28 positions the image vertically and movement of the member 28 along slot 29 in base member 31 positions the image horizontally. The image of the radar map may be projected on a second screen shown as a ground glass plate 32 for viewing the radar map and the radar picture side-by-side by the movement of member 28 along slot 29 to position housing 40 so that lens 34 projects the image of the film to the ground glass plate.

A shutter 33 is placed between lens 30 and window 7 to intermittently interrupt the projection of the radar map on screen 9. This shutter is designed to operate at a frequency below the critical flicker frequency of the human eye. The critical flicker frequency of the human eye is around ten cycles per second but may vary with different individuals or may vary from time to time in the same individual. A frequency of two cycles per second has been satisfactorily used.

Figure 6A:
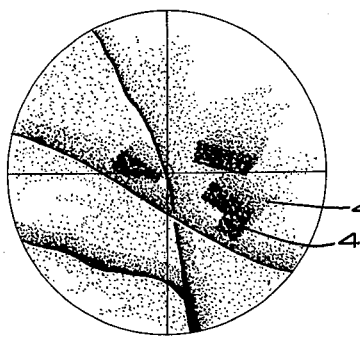
FIG. 6a is a view of a different radar presentation having the image of a similar radar map projected thereon but slightly out of superposition with the radar presentation wherein only the image of the radar map is intermittently interrupted.
Figure 6B:
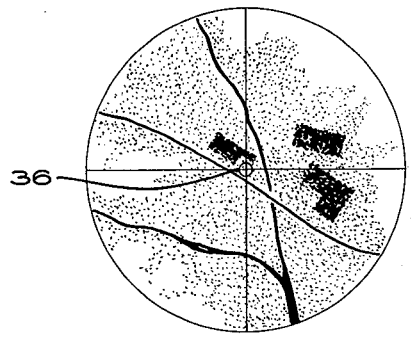
FIG. 6b is the same as FIG. 6a with the image of the radar map and the radar presentation in exact superposition.

In operation a radar map is first projected on ground glass plate 32 by lens 34 and the radar presentation is formed on the screen 9 of the cathode ray tube by the electron beam of the cathode ray tube. The ground glass plate and the screen of the cathode ray tube are viewed in side-by-side position as shown in FIG. 4 until it is determined that the radar presentation and the radar map projection represent the same area of the ground. Once this determination has been made, that is that the two configurations are similar, the member 28 is moved along the slot 29 to position housing 40 so that lens 30 projects the radar map onto screen 9 of the cathode ray tube. The radar map will have the desired target 36 marked thereon as shown in FIG. 4. Although the radar presentation may not show the target, the target will be marked on the radar map beforehand from supplemental information giving the position of the target with respect to landmarks displayed on the radar map. The projected mark indicating the target is placed directly under crosshairs 23 by adjusting the position of housing 40 with respect to lens 30. When the map is projected onto the cathode ray tube screen 9 shutter 33 is in operation to intermittently interrupt the projection at a frequency below the critical flicker frequency of the human eye. When viewing a radar presentation with the image of a similar radar map intermittently projected thereon as shown in FIG. 6a it is observed that the details of the radar presentation fluctuate in a direction and to an extent determined by the direction and extent that the radar presentation is out of superposition with the image of the radar map. By adjusting the potentiometers 17 and 18 the radar presentation is moved in the direction of the fluctuation and the fluctuation will be observed to disappear when the image of the radar map and the radar presentation are in exact superposition as shown in FIG. 6b. Should the radar map and radar presentation be out of superposition in a rotational direction the image of the radar map is rotated by rotation of shaft 26 to bring the two into rotational alignment. By maintaining the projection of the marked target 36 on the radar map directly under the crosshairs and eliminating the fluctuation of the radar presentation the crosshairs 23 will be accurately positioned on the desired target. The desired target is thus identified.

For reconnaissance information it is desirable to make a photographic record of the area flown over by the plane on a bombing mission and to indicate on this record the point at which a bomb is dropped. This is accomplished by positioning a motion picture camera 37 to photograph screen 9 through window 8 from the back side. A mark may be placed on the motion picture film by bomb release mechanism, not shown, to indicate the time of bomb drop.

Referring to FIGS. 2 and 3 a system for superposing the image of a radar map on a radar presentation is shown utilizing a commercially available cathode ray tube 41. The projector 44 in this instance is mounted as in FIG. 1 for positional adjustments but is always positioned to project the image of the radar map to a ground glass plate 45 designated 45' in its secondary position shown in dotted lines. For viewing the image of the radar map and the radar presentation in the side-by-side position as indicated in FIG. 4 the radar presentation is viewed through a half-silvered mirror 38 and ground glass plate 45, in position 45', is viewed through half-silvered mirror 39, in position 39'. Ground glass plate 45 and half-silvered mirror 39 may be rotated as a unit to the position indicated in dotted lines and designated 45' and 39' respectively. When it is desired to superpose the image of the radar map on the image of the radar presentation ground glass plate 45 and half-silvered mirror 39 are rotated into the positions shown in full lines in FIGS. 2 and 3. In this position ground glass plate 45 forms an angle of 90° with the screen 42 of the cathode ray tube 41. The half-silvered mirror 38 in front of screen 42 is positioned at an angle of 45° to screen 42 and half-silvered mirror 39 is positioned at an angle of 45° to ground glass plate 45. Referring to FIG. 3 it should be pointed out that in order to introduce no parallax into the superposed images the distance between ground glass plate 45 and half-silvered mirror 38 should be equal to the distance between screen 42 of cathode ray tube 41 and half-silvered mirror 38. If these distances are not equal the images will appear to fluctuate in a direction along the line of sight of the observer. An observer will view the face of cathode ray tube 41 through half-silvered mirror 38 to see the radar presentation. The image projected on ground glass plate 45 will be reflected by half-silvered mirror 38 so that the observer sees the projected image and the radar presentation in the same visual field and appears to see them in the same plane. As in the first embodiment crosshairs are marked on the face of the cathode ray tube and the radar map has the desired target marked thereon. The projector 44 is positioned so that the image of the mark on the radar map lies directly over the intersection of the crosshairs. As in the first embodiment biasing potentiometers 17 and 18 are provided for adjusting the position of the radar presentation under the crosshairs.

A shutter 43 is provided between projector 44 and ground glass plate 45. This shutter operates at a frequency below the critical flicker frequency of the human eye when the image of the radar map is projected into the visual field with the radar presentation and remains open when the image of the radar map and the radar presentation are viewed in the side-by-side position.

A light source in the projector capable of operating in a stroboscopic manner might well replace the shutter.

The radar presentation is maintained on constantly. When the radar map and the radar presentation are out of superposition the radar presentation is observed to fluctuate in the direction of the image of the radar map and to an extent determined by the extent to which the image of the radar map is out of superposition with the radar presentation. A radar presentation and the image of a radar map may be individually identified as shown in FIG. 6a, in that the radar presentation is the dominant configuration 46 and the intermittent image of the radar map is the extent of the observed fluctuation 47. By moving the dominant configuration toward the extent of the observed fluctuation until the fluctuation disappears the image of the radar map can be accurately superposed on the radar presentation. As in the first embodiment the image of the radar map may be brought into rotational alignment with the radar presentation by rotating projector 44.

A mirror 48 is positioned at right angles to half-silvered mirror 38 to reflect an image of the radar presentation from half-silvered mirror 38 to a motion picture camera 49 positioned to observe mirror 48.

Figure 5A:
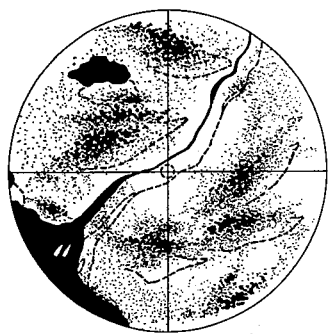
FIG. 5a is a view of a radar presentation with the image of a radar map projected thereon out of superposition wherein both the radar map image and the radar presentation are intermittently interrupted alternately.
Figure 5B:
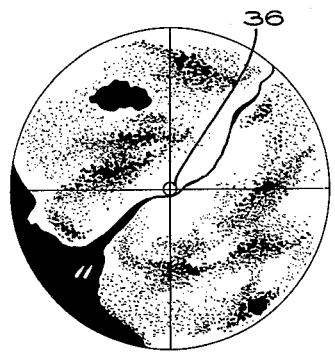
FIG. 5b is the same as FIG. 5a but with the radar presentation and image of the radar map accurately superposed.

It has been found that by alternately displaying both of two similar configurations, one on the other, that the observed result is a back and forth motion between the positions of the two configurations and if the lengths of presentation of the two are equal neither is dominant but a configuration appears to move back and forth between limits defined by the positions of the two configurations as shown in FIG. 5a. When one configuration is presented for a longer duration of time than the other the one presented for the greater length of time is dominant and each may be individually identified. As illustrated in FIG. 5b exact superposition removes the observed motion in the configurations.

It has been found that if one operator removes the observed fluctuations from the configurations, another operator will observe no fluctuations, thus the factor of personal judgment is minimized. When two similar configurations are out of superposition the fluctuation is conspicuous and annoying to observe and does not require a skilled operator to detect.

In viewing the screen of a cathode ray tube to eliminate the fluctuations in the configurations presented thereat the angle at which the screen is viewed is not critical, thus allowing an operator to view the screen from any comfortable position.

While the invention has been illustrated by way of examples of map matching systems its use is by no means limited thereto. The invention is equally useful in superposing any two similar configurations.

While there have been shown and described and pointed out the fundamental novel features of the invention as applied to a preferred embodiment, it will be understood that various omissions and substitutions and changes in the form and details of the devices illustrated and in their operation may be made by those skilled in the art, without departing from the spirit of the invention. It is the intention, therefore, to be limited only as indicated by the scope of the following claims.

What is claimed is:

1. The method of superposing the displays of two similar configurations comprising the steps of displaying a first configuration on the display of a second similar configuration, intermittently interrupting the display of the first configuration at a frequency below the critical frequency of the human eye and adjusting the relative positions of the displays until the observed fluctuation in the display of the second configuration is eliminated.

2. The method of superposing two similar images comprising the steps of intermittently displaying one image at a frequency below the critical frequency of the human eye so that its details lie in proximity to the corresponding details of the other and adjusting the relative position of the two images until the observed fluctuation in the images is eliminated.

3. The method of superposing the image of a first configuration on a second similar configuration comprising the steps of intermittently projecting the image of the first configuration at a frequency below the critical frequency of the human eye on the second configuration and adjusting the position of said image until the observed fluctuation of said second configuration is eliminated.

4. The method of superposing two similar images comprising the steps of alternately revealing said images at a frequency below 10 cycles per second in a common visual field and adjusting the relative position of said images until the observed motion of said images is eliminated.

5. The method of accurately superposing two similar configurations comprising the steps of intermittently displaying one on the display of the other at a frequency below the critical flicker frequency of the human eye and adjusting the relative positions of the two until the observed oscillation of the display is eliminated.

6. The method of locating a point within a first configuration from a second similar configuration having the point marked therein, comprising the steps of displaying the said configurations in close proximity, intermittently interrupting the display of one of said configurations at a frequency below the critical frequency of the human eye, and adjusting the relative positions of the displays in the direction of the observed fluctuation until the fluctuation is eliminated and locating the point marked in the second configuration.

7. The method of superposing two similar configurations comprising the steps of alternately displaying the two configurations in the same visual field at a frequency below the critical frequency of the human eye, one for longer durations than the other, and relatively moving the display of shorter duration toward the resulting dominant display until the observed fluctuation in the displays is eliminated.

8. The method of superposing two similar configurations comprising the steps of constantly displaying one configuration, intermittently displaying the details of the other configuration at a frequency below the critical frequency of the human eye in close proximity to the details of the first and moving the intermittent display toward the constant display until the observed fluctuation of the constant display is eliminated.

9. The method of superposing two similar configurations comprising the steps of constantly displaying one configuration, intermittently displaying the details of the other configuration at a frequency below the critical frequency of the human eye in close proximity to the details of the first and moving the constant display in the direction of its observed fluctuation until the observed fluctuation in the constant display is eliminated.

10. The method of positioning a crosshair sight on a target located within a radar presentation when said target is marked on a radar map of the target area, comprising the steps of intermittently projecting an image of said map at a frequency below the critical frequency of the human eye so that the details thereof lie in proximity to the corresponding details of said radar presentation, positioning the crosshair sight on the image of said mark and adjusting the position of said radar presentation until the observed fluctuation of the radar presentation is eliminated.

11. The method of locating a target within a radar presentation when said target is marked on a radar map of the target area, comprising the steps of intermittently projecting an image of the radar map at a frequency below the critical frequency of the human eye so that the details of said image lie in proximity to the corresponding details of said radar presentation, adjusting the relative positions of said radar presentation and the image of said radar map until the observed fluctuation of said radar presentation is eliminated and locating the image of the target marked on the radar map.

References Cited in the file of this patent

UNITED STATES PATENTS

| | | |
|---|---|---|
| 706,297 | Bruyn | Aug. 5, 1902 |
| 2,316,550 | Bigalke | Apr. 13, 1943 |
| 2,460,350 | Hinman | Feb. 1, 1949 |
| 2,522,880 | Lindenblad | Sept. 19, 1950 |
| 2,526,682 | Mulberger et al. | Oct. 24, 1950 |
| 2,581,358 | Busignies et al. | Jan. 8, 1952 |
| 2,586,743 | Thresher et al. | Feb. 19, 1952 |

FOREIGN PATENTS

| | | |
|---|---|---|
| 657,047 | Great Britain | Sept. 12, 1951 |